United States Patent
Pozniak et al.

[11] Patent Number: 5,863,510
[45] Date of Patent: Jan. 26, 1999

[54] MODULAR INTERCHANGEABLE TREATMENT SYSTEM

[75] Inventors: Peter M. Pozniak, San Jose; Benjamin R. Roberts, Los Altos; Ronald W. Michelson, Cupertino; Curtis L. Lindskog, San Mateo; A. Laird Lobban, Morgan Hill, all of Calif.

[73] Assignee: ATC Associates, Inc., Pleasanton, Calif.

[21] Appl. No.: 68,575

[22] Filed: May 26, 1993

Related U.S. Application Data

[63] Continuation of Ser. No. 837,234, Feb. 14, 1992, abandoned.

[51] Int. Cl.⁶ ........................................... A61L 2/00
[52] U.S. Cl. ........................... 422/292; 405/128; 134/21; 134/22.11; 134/24
[58] Field of Search ................................. 422/292, 300; 110/237, 346; 405/128, 129; 134/21, 22.11, 24; 252/626, 633; 285/12, 137.1, 150, 157

[56] References Cited

U.S. PATENT DOCUMENTS

| | | | |
|---|---|---|---|
| 4,352,601 | 10/1982 | Valiga et al. | 405/128 |
| 4,383,920 | 5/1983 | Muller et al. | 210/87 |
| 4,774,974 | 10/1988 | Teter | 134/21 |
| 4,838,733 | 6/1989 | Katz | 405/129 |
| 4,839,061 | 6/1989 | Manchak, Jr. et al. | 405/128 |
| 4,875,420 | 10/1989 | Hay et al. | 110/233 |
| 4,934,283 | 6/1990 | Kydd | 110/237 |
| 4,935,167 | 6/1990 | Watazychyn | 110/237 |
| 4,969,311 | 11/1990 | Nutter et al. | 134/21 |
| 5,030,033 | 7/1991 | Heintzelman et al. | 405/52 |
| 5,055,204 | 10/1991 | Bogart | 210/758 |
| 5,098,580 | 3/1992 | Andersen | 134/21 |
| 5,102,503 | 4/1992 | Silinski et al. | 202/83 |
| 5,129,957 | 7/1992 | Sheppard et al. | 134/22.11 |

*Primary Examiner*—Laura Edwards
*Attorney, Agent, or Firm*—Blakely, Sokoloff, Taylor & Zafman

[57] ABSTRACT

A modular, enclosed, interchangeable hazardous material treatment plant is disclosed. The treatment plant can utilize any one of a variety of abatement technologies for treating an unauthorized discharge of hazardous material, including spray aeration, vacuum extraction, biological, carbon, ozone, ultra-violet, or other. Regardless of the type of plant, connection to the site is made between the enclosed plant and the standard underground connection port which contains connection to all underground piping. No on-site assembly or disassembly of the plant is required. If a succession of treatment plants is required, one can be disconnected and the next connected within an hour. During treatment, all that is visible above ground is the enclosure. After treatment of the site is complete, the only visible remainder of the plant is the cover of the underground connection port.

24 Claims, 7 Drawing Sheets

MODULAR INTERCHANGEABLE TREATMENT SYSTEM

This is a continuation of application Ser. No. 07/837,234, filed Feb. 14, 1992 now abandoned.

BACKGROUND OF THE INVENTION

The present invention relates to the field of hazardous material spill or release remediation and particularly to treatment systems for treating groundwater and soil containing the hazardous material.

PRIOR ART

In many industries and businesses, a wide variety of chemical products are manufactured, processed, or stored at various facilities. For example, on a large scale, refineries refine crude oil into gasoline and other by-products. Chemical plants produce large volumes of a variety of useful products such as solvents. Other businesses that do not produce these products have use for them in manufacturing other products and store them on-site. For example, the semiconductor industry uses a wide variety of solvents and chemicals in the manufacture of semiconductor devices. Finally, still other businesses store such chemical products for resale to other businesses or consumers. A familiar example of such a business is a retail service station. A typical retail service station may store anywhere from approximately 10,000–60,000 gallons of gasoline and diesel fuel on-site.

If any of the above-mentioned chemical products are released inadvertently, for example due to a storage tank rupture, they become an environmental hazard. Usually, local, state, and federal agencies which regulate hazardous materials require remediation or clean up of a spill site by the entity responsible for the spill. Normally, regulations dictate that the groundwater or soil at the site must be remediated to a level measured in parts per million (ppm) or parts per billion (ppb). For soil concentrations, 1ppm=1 milligram (mg)/kilogram(kg) and 1ppb=1 microgram ($\mu$g)/kg. For groundwater concentrations, 1ppm=1mg/liter(l) and 1ppb=1 $\mu$g/l. To accomplish this, some type of on-site hazardous material treatment plant is required to extract the impacted groundwater, as well as any chemical vapor concentration in the soil, treat or destroy the hazardous material, and release the processed water and/or air back to either the site, a nearby stream, sewer, storm drain, or atmosphere. When released back to the site, the process is known as "re-injection." When re-injection can be utilized, the re-injection point is usually located at a point "upstream" from the release. The re-injection causes the downstream groundwater level to rise, which further helps to remediate the hazardous material. Regardless of where the effluent is released, the allowable concentration of hazardous material in the effluent is also strictly controlled by local, state, and federal guidelines. In this application, the term hazardous material is not to be limited in meaning by definitions contained in environmental regulations but is used broadly to include any type of chemical compound, including hydrocarbons, solvents, volatile organic compounds (VOCs), and halogenated VOCs.

The type of treatment plant which is used to treat the material pulled from the spill site will depend upon the particular hazardous material spilled and the concentration of hazardous material. For any given hazardous material, a treatment plant that efficiently removes high concentrations, generally is inefficient and uneconomical when the concentration level becomes low. In this regard, it is important to keep in mind that environmental regulations generally have stringent standards requiring that the concentration of the hazardous material at the site and in the effluent be in the ppm or ppb range, or non-detectable. Thus, after the majority of the spilled material has been removed, further processing by equipment capable of removing trace concentrations from the impacted soil and groundwater is necessary to comply with environmental regulations.

Usually hazardous material treatment plants are fixed and built on location at the spill site. First, vapor and/or groundwater wells are drilled at the site. Test samples are taken from the wells to help develop a remediation plan. Later, these and other wells will be used to extract the groundwater and soil vapor to be processed. Generally, a concrete pad upon which to construct the plant is built. The concrete pad usually has numerous piping and electrical facilities built in. Next, various pieces of equipment are bolted into the pad, such as pumps, air compressors, tanks, drums, and other pieces of processing and abatement equipment. Often, a small operation office is built at the site. Finally, the entire plant is often surrounded by a chain link fence for security or aesthetic purposes.

There are several disadvantages of the prior art plant. First, at a site such as a retail or wholesale service station which serves the general public, the plant is unsightly and its presence may deter would-be customers. Also, since the equipment is exposed, it can easily be damaged by severe weather conditions, vandalism or tampering. Additionally, the equipment might present a safety hazard to children and trespassers. Also, if any of the equipment were to leak, such a leak would be considered an additional discharge of hazardous material and could subject the owner of the site to further legal and civil liability.

In addition, the plant is needed only for as long as is necessary to abate the subsurface conditions. Thus, after the plant has been used to full advantage, it must be disassembled. Generally, after disassembly the various pieces of equipment discussed above are no longer useable so that the residual value of the plant is low. As a result, much of the capital outlay is not recoverable. Because of this, most leasing companies will not buy and lease-back the treatment plant, so that the site owner must find some other way to fund the treatment plant. Another consequence of the one time use of these plants is that site owners are often unable to afford a succession of different types of treatment plants—usually the most efficient way to remediate a site—and instead continue to use one type of plant for the entire clean-up. In addition to the increased cost of multiple treatment plants, there is a further requirement that a building permit be obtained for each plant built on the site.

Another potential problem is that if the original plant as built proves to have insufficient capacity or over capacity, there may be no cost effective way to increase or decrease its capacity, and a new plant must be designed and built. Finally, after disassembly, the plant still leaves an undesired footprint on the site. For example, the concrete pad as well as some of the piping and fastening means usually remain on-site, unless additional expenses are incurred for its demolition.

What is needed is a method and apparatus for remediating hazardous material spill sites that do not require a fixed plant to be built on the site. Further it is desirable that the apparatus be reusable in order to keep life cycle costs low and provide residual value. The method and apparatus must allow for a variety of different types of treatment systems to be used at one site with no or only minimal alterations to the site. It is also desirable that the system be protected from the environment and human interference. Finally, such a system should not expose unsightly processing equipment to public view and should leave no or only a minimal footprint on the site after it is removed.

SUMMARY OF THE INVENTION

A hazardous material treatment plant for processing hazardous materials extracted from the groundwater or soil at a spill site or unauthorized release is disclosed.

The disclosed treatment plant is completely enclosed in an enclosure which protects the treatment plant from weather conditions and human tampering. The enclosed treatment plant is transportable and may be placed at a site without assembly and removed from a site without disassembly.

In the preferred embodiment, underground piping is first laid and connections to the underground piping are provided for in a below ground connection port. The enclosed treatment plant is then placed over the connection port and connection between the treatment plant and underground piping connections are made through the bottom of the enclosure. Thus, all that is visible at the site is the enclosure.

The connecting means in the connection port and in a variety of different types of treatment plants are standard. Thus, after a particular site has been prepared for one type of treatment plant, that treatment plant can be removed and replaced with a different type of treatment plant as concentrations at the site change during remediation. This interchangeability allows for quick and economical installation and removal of a succession of treatment plants to provide the most efficient treatment as the hazardous material concentration level changes. After removal from a particular site, a treatment plant can then be relocated and used at a different site.

DETAILED DESCRIPTION OF THE PREFERRED EMBODIMENT

An enclosed, transportable, and interchangeable hazardous material treatment plant is disclosed. In the following description, numerous specific details are set forth, such as specific pieces of equipment, vessels, capacities, flow rates, piping layouts, etc. in order to provide a thorough understanding of the present invention. It will be obvious, however, to one skilled in the art that these specific details need not be employed to practice the present invention. Further, although the present invention is described in conjunction with the treatment of a fuel spill at a retail service station, the present invention can be used at any site such as those described in the background section having any type of hazardous material spill or discharge. In other instances, well known details are not described in order not to obscure unnecessarily the present invention.

In the following description of various treatment plants and the flow therein, the terms "water," "groundwater," "well water," and "impacted water" will be used to describe the flow of the groundwater to be treated at various stages of processing. However, it is to be understood that various constituents, including the hazardous material to be removed and additives from processing, are present in addition to water. The presence of hazardous material or additives in the water can be determined from the context.

The present invention is practiced at a site which has had an unauthorized release or discharge. Generally, the bulk of the hazardous material will reside in the groundwater as dissolved constituents, as a vapor in the soil, or, if immiscible with water and lighter than water, on top of the groundwater. Usually, regardless of where the bulk of the concentrations resides, there will be at least some detectable concentration in either the soil, the groundwater, or both.

Figure 1:
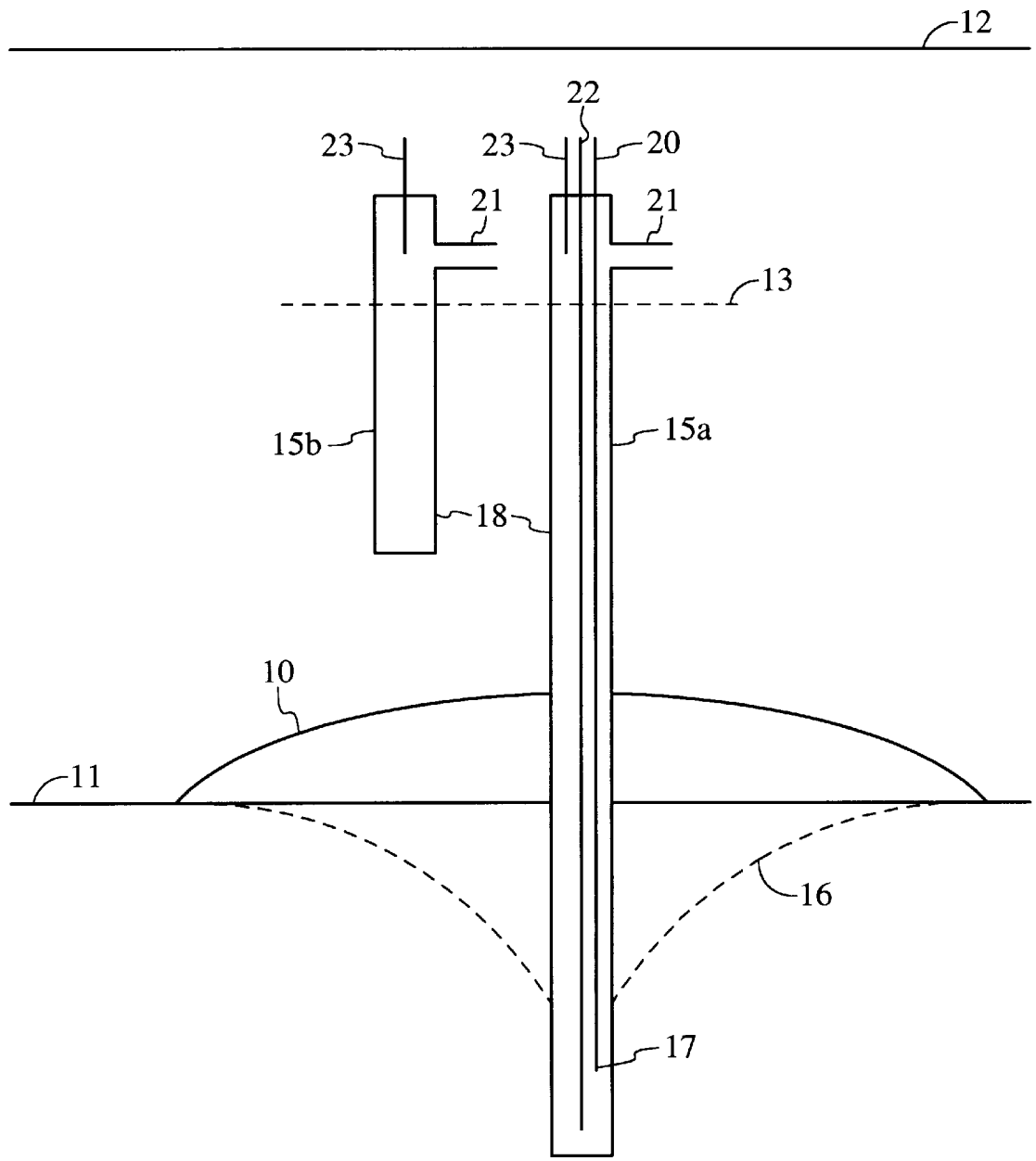
FIG. 1 shows a below-ground view of well casings in place at a hazardous material spill site.

Referring to FIG. 1, a below ground view of the site of a fuel release is shown. The site shown in FIG. 1 could be, for example, a retail service station after a hydrocarbon fuel such as gasoline, diesel, or aviation fuel has been released due to a storage tank rupture. The fuel 10, which is lighter than water, is shown on top of groundwater 11. Generally the level of groundwater 11 can be anywhere from approximately 3–200 feet below the ground level 12. Immediately after the release of fuel into the soil, the fuel level is higher at the center of the release than at the edges as shown. If the release is not contained and the fuel is not recovered, the fuel will migrate covering a larger area, and impact the underlying groundwater table.

In order to contain and remove the fuel 10 from the soil and/or groundwater, it is necessary to install one or more well casings 15 shown in FIG. 1. The top portion of the well, approximately the portion above dashed line 13, known as the well head, is located approximately 1–3 feet below ground level 12. Each well head is enclosed in a box covered with a cover for easy access. In a release such as that shown in FIG. 1, there will be vapor concentrations in the soil, the floating fuel 10, as well as a small amount of dissolved fuel constituents in the groundwater. Generally the groundwater will contain concentrations of additives such as benzene, toluene, ethylbenzene, xylene, and similar compounds. The contaminants in the groundwater are generally referred to as volatile organic compounds (VOCs).

The groundwater will be extracted by a pump at the bottom of casing 15a (not shown) though water transport line 20. The pump at the bottom of well casing 15a is, in the currently preferred embodiment, pneumatically powered. The air to power the pump is supplied by an above-ground compressor through air transport lines 22. Generally, electric powered pumps are not used in situations where there is floating material as mixing of the groundwater and floating material will occur. Also, electric pumps may present a safety hazard in that sparking may lead to an explosion. However, if there is no floating material, electric pumps may be used, and electricity to the pump would be supplied through well casing 15a. While the groundwater is being extracted, a "cone of depression" 16 is created wherein the localized level of the groundwater drops as shown by the dashed line 16. When this occurs, the fuel 10 will no longer be as shown but will be contained within the cone 16.

In addition to water transport lines 20, there can also be vapor transport lines 21, shown attached to casings 15a and 15b. The well casing 15b is a vapor only well while well casing 15a is both a vapor and water well. Also shown in FIG. 1 are vacuum sense lines 23. The sense lines 23 are coupled to meters located in a treatment plant, so that an accurate measure of the vacuum being pulled at all well casings can be made from the treatment plant, and from there can be adjusted if needed. The well casings 15a and 15b have porous zones 18 through which the soil vapor is extracted. Before placement of transport line 20 in well casing 15a and porous zones 18 in well casings 15a and 15b, testing is done to determine the location of the groundwater bearing zone and of the floating fuel so that inlet 17 of water transport line 20 will be within the groundwater bearing zone while the location of porous zone 18 of the casings 15 will be above the floating fuel. It is desired to extract only the impacted groundwater and soil vapor and not the liquid fuel 10 so that the fuel 10, a hazardous material, does not have to be stored on-site and later transported and disposed of. Eventually, the fuel 10 will be removed as it volatilizes and is pulled through the vapor transport lines 21. In some cases, however, liquid fuel 10 (or other liquid hazardous material if at a release site other than the fuel release site of FIG. 1) may be pumped out of the ground directly and stored at the site for later removal. There can be any number of vapor and water wells depending upon the geology of the site, volume of impacted soil/water and chemical concentrations. In the prior art, all water transport lines 20 and vapor transport lines 21 are plumbed directly from the well head to the appropriate processing equipment affixed to the site. In the present invention, all transport lines form all well heads are plumbed to an underground connection port described below.

Figure 2:
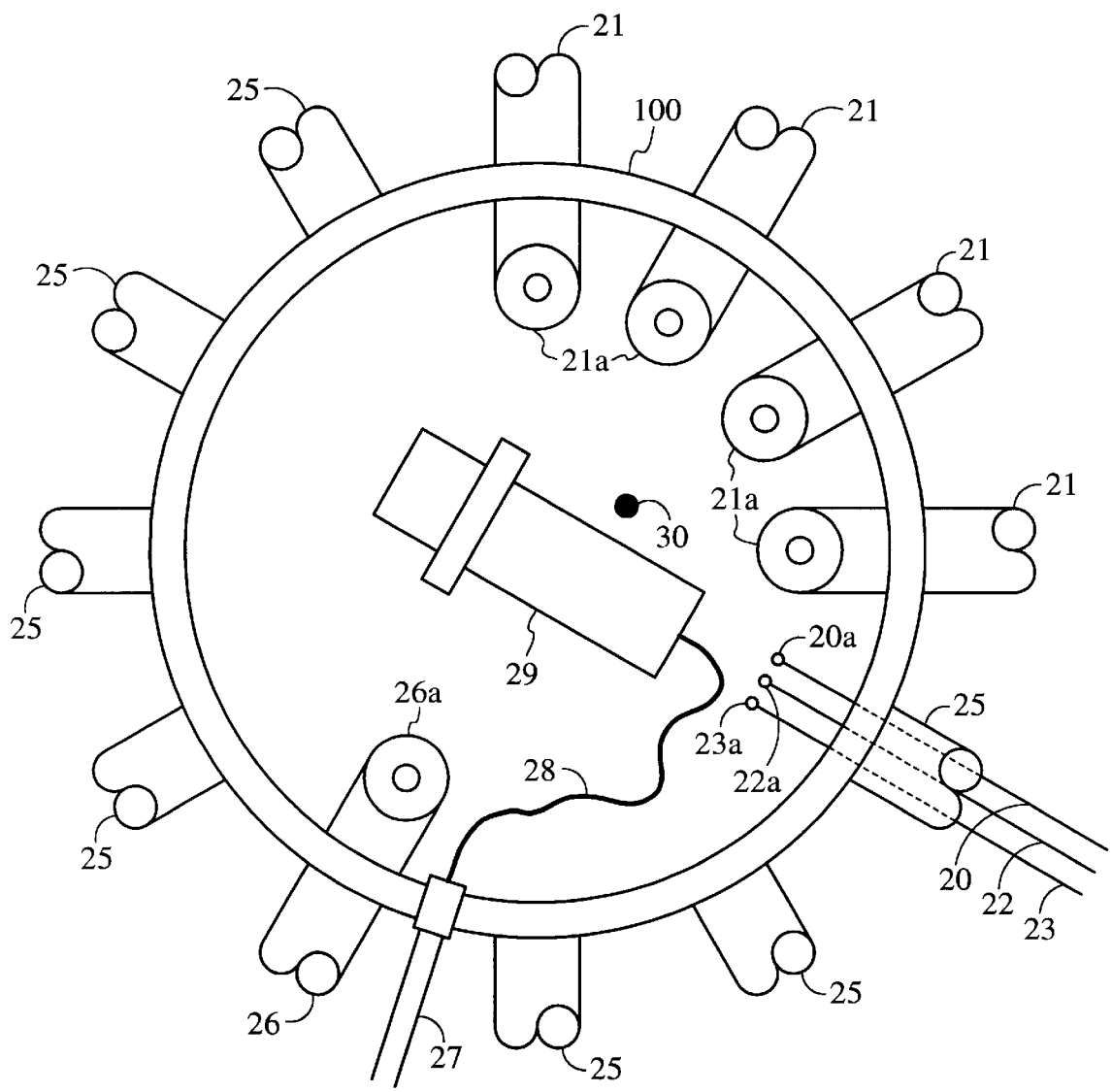
FIG. 2 shows the in-ground connection port of the present invention.

FIG. 2 shows underground connection port 100 of the present invention. Connection port 100 provides means for making connection to all underground piping necessary for any type of treatment plant. Connections in connection port 100 are made for all transport lines conveying liquid and vapors from the site, whether they be soil vapor, contaminated groundwater, or liquid hazardous material (e.g. the liquid fuel 10 of FIG. 1). In addition, connections for any required transport lines or utilities to the underground piping, for example, supply air or electricity for the pump, or return of treated effluent, are provided for in connection port 100. In addition to connections to and from the underground piping, connections to all utilities required for the treatment plant such electricity, natural gas or propane, and telephone lines are provided in connection port 100.

In the following figures and descriptions, the present invention is illustrated by several different types of connections. However, it will be understood that not all of the possible types of connections that may be needed for a particular site have been illustrated. It will be obvious, however, to one skilled in the art that connections not illustrated herein can be made in a manner similar to those illustrated. Referring to FIG. 2, a top view of connection port 100 is shown. In the currently preferred embodiment, connection port 100 is fabricated from a 55 gallon polyethylene drum. Also in the preferred embodiment, connection port 100 is enclosed in a bentonite cement slurry, (not shown) which is initially a gel-like material which later hardens to resemble concrete. The bentonite concrete slurry is impermeable to many liquids, and serves as double containment ensuring that any leak or discharge in connection port 100 will not be re-released into the ground should connection port 100 be ruptured. Connection port 100 is, in the currently preferred embodiment, completely underground and is accessed through a cover to expose the view shown in FIG. 2.

Connection port 100 has a plurality of vapor transport lines 21 fitted radially around connection port 100 and located approximately 1 foot below ground level. Although only 4 vapor transport lines 21 are shown, connection port 100 can accommodate additional vapor transport lines 21 if there are more than four vapor wells. The vapor transport lines come from all vapor or vapor and water well casings at the site, such as the well casings 11a and 15b of FIG. 1. Vapor lines 21 are 2 inch schedule 80 polyvinyl chloride (PVC) pipes in the currently preferred embodiment. Also shown in FIG. 2 are connection means 21a. In the currently preferred embodiment, connection means 21a are 2 inch quick connect couplings which are placed face up for easy connection to the treatment plants to be described. When not in use, connection means 21a are covered with dust caps.

Also shown in FIG. 2 are containment pipes 25 which are located radially around connection port 100, approximately 1 foot below vapor transport lines 21. Containment pipes are 3 inch schedule 40 PVC pipes. Containment pipes pipes 25 carry all transport lines other than vapor transport lines 21 for each well at the site to connection port 100. In FIG. 2, water transport line 20, air transport line 22, and vacuum sensor line 23 from a well such as 15a of FIG. 1 are shown in one of the containment pipes 25. The other containment pipes 25 of FIG. 2 would also have the above-mentioned transport lines from any other water wells at the site. Additionally, any other transport lines to the wells would be carried in containment pipe 25.

Also shown in FIG. 2 are connection means 20a, 22a and 23a. In the currently preferred embodiment, connection means 20a is 1 inch quick connect coupling, and connection means 22a and 23a are ½ inch quick connect couplings. For convenience, each bundle of transport lines such as transport lines 20, 22 and 23 coming from a single well are tied together and labeled as to which well they come from.

FIG. 2 also shows effluent transport line 26, which is a 3 inch schedule 40 PVC pipe in the currently preferred embodiment. Effluent transport line 26 has connection means 26a which is a 3 inch quick connect coupling in the currently preferred embodiment. As with vapor transport lines 21, the quick connect coupling is positioned face up and includes a dust cap to seal the line when not in use. Effluent transport line 26 is used for re-injection of treated water back to the site. Also, shown in FIG. 2 is conduit 27 through which the electrical supply line 28 for the treatment plant is brought. Connector 29 is coupled to supply line 28. Connector 29 is a 230V, 3 phase 100 Amp. 8 pin and tube connector. In addition to electric supply line 28, other utilities, such as natural gas and telephone lines can be brought into connection port 100 and supplied with appropriate connection means to allow for quick and easy connection to a treatment plant. Telephone lines can be used for voice communication and to allow remote access to a treatment plant's control system. Finally, connection port 100 has grounding rod 30, which is a ½ to ⅝ inch diameter, 8 feet long copper-clad steel rod in the currently preferred embodiment. A grounding or bonding line from the treatment plants to be described is coupled to grounding rod 30 to provide electrical grounding.

With the connection port 100 described above, no further external connections from the plant to the underground piping or to any utilities are required. During remediation of the site, only the enclosed treatment plant to be described below is visible. Once treatment of the site is complete, the only portion of the remaining treatment facilities visible from above ground is the cover covering connection port 100.

Figure 3:
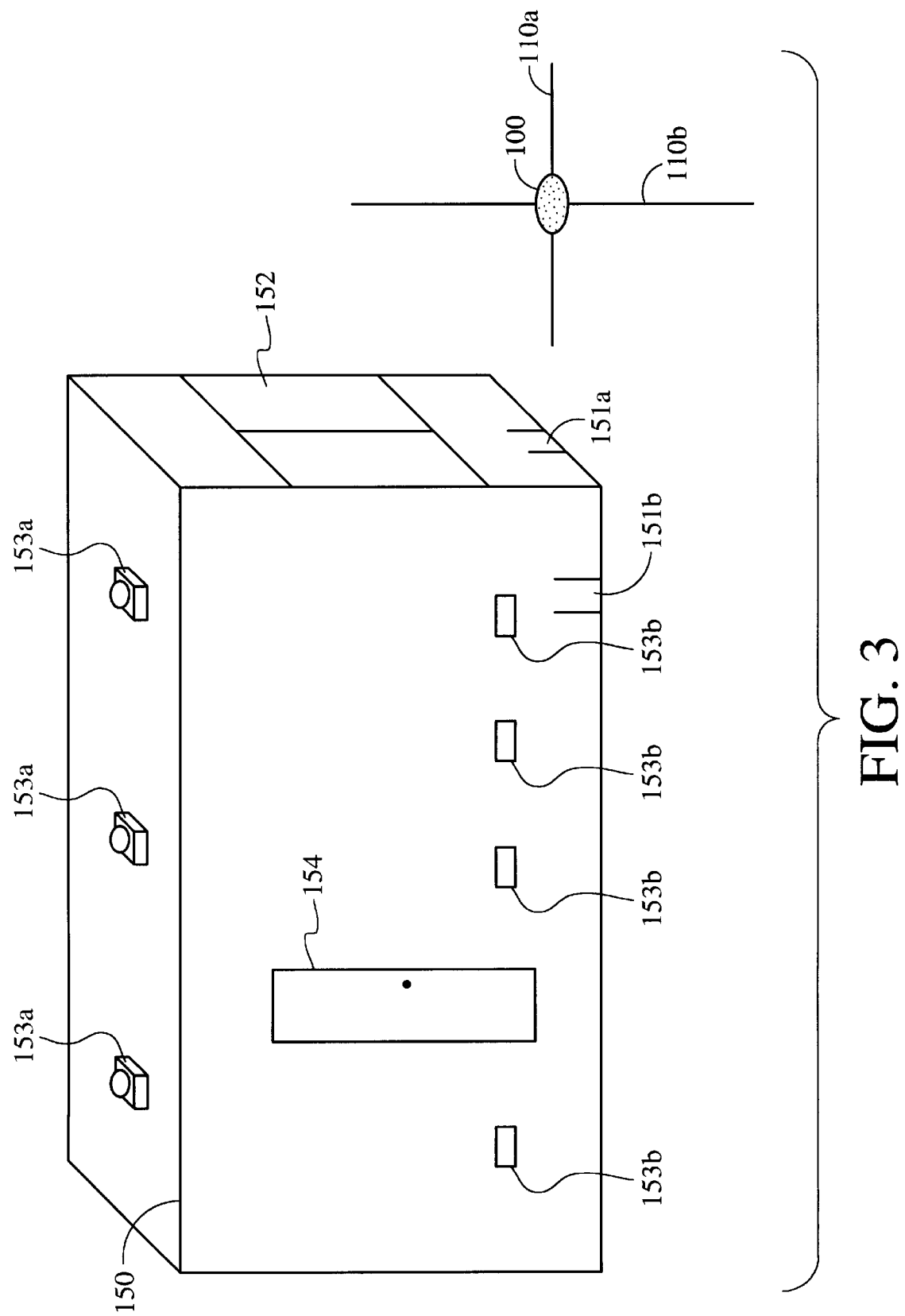
FIG. 3 shows the enclosure of the present invention.

FIG. 3 shows the currently preferred embodiment of the enclosure 150 of the present invention. In the currently preferred embodiment, enclosure 150 is an intermodal container of the type used for transport of cargo by a variety of transport vehicles including ships, trains, trucks, and airplanes. Enclosure 150 is eight feet high by eight feet wide by 20 feet long in the currently preferred embodiment. Several alternative embodiments exist to accommodate larger treatment plants. In the alternative embodiments, the length of enclosure 150 can be 24, 27, 40, and up to 70 feet long. All of the above measurements are the external measurements of enclosure 150. In the currently preferred embodiment, enclosure 150 is made of steel and aluminium.

Also shown in FIG. 3 are alignment marks 110a and 110b, and 151a and 151b. Alignment marks 110a and 110b comprise painted strips extending perpendicularly from connection port 100. Alignment marks 151a and 151b each comprise two strips spaced 5 inches apart, located near the base of enclosure 150. As will be seen, the opening at the bottom of enclosure 150 for making connections between the treatment plant and the in-ground connections is 30 inches. Thus, when placing an enclosed treatment plant at a site, alignment mark 110a must be wholly within the two strips of alignment mark 151a, and the enclosure 150 must then be maneuvered until alignment mark 110b is wholly within the two strips of alignment mark 151b. This will ensure that the entire 24 inch opening in the connection port 100 is accessible through the opening in the bottom of enclosure 150. Also shown in FIG. 3 are doors 152 at one end of enclosure 150. In addition to the doors 152 at the end shown, there may also be doors at the other end of enclosure 150 and/or on one or both sides, such as side door 154, of enclosure 150 to facilitate access to the processing equipment. Also shown in FIG. 3 are top vents 153a and side vents 153b. Additionally, the side of enclosure 150 not shown in FIG. 3 also has side vents 153b. The vents 153a and b ensure adequate ventilation in enclosure 150.

Figure 4:
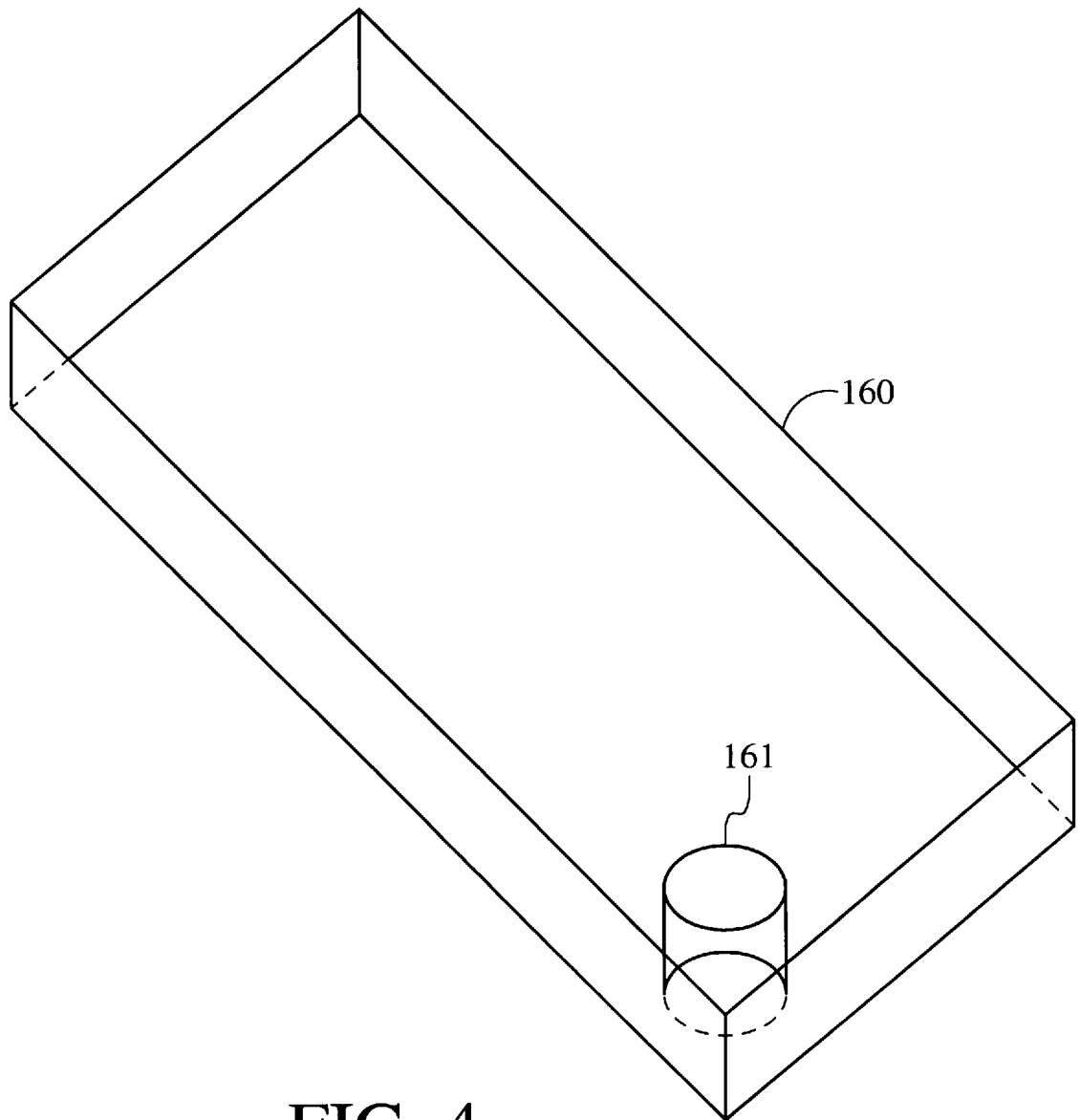
FIG. 4 shows the enclosure liner of the present invention.

FIG. 4 shows one of two liners 160 which are placed in the bottom of enclosure 150. In the currently preferred embodiment, a first liner 160 is placed in the bottom of enclosure 150, followed by insulation made of high density polyethylene (HDPE) netting or open cell foam, followed by a second liner 160. In the currently preferred embodiment, a liquid sensor is placed between the two liners in order to detect a breach in the first liner. In the currently preferred embodiment, both liners 160 are made of HDPE and are 20 mils thick. The length and height of lines 160 are determined by the inside length and height of enclosure 150. Lines 160 are 18 inches high. Collar 160 is 30 inches high and is placed over the previously mentioned opening in the bottom of enclosure 150. In the currently preferred embodiment, the distance between each edge of liner 160 and the collar 161 is 12 inches. With the dimensions given above, the liners 160 can contain a discharge totaling about 232 cubic feet or 1740 gallons.

Figure 5:
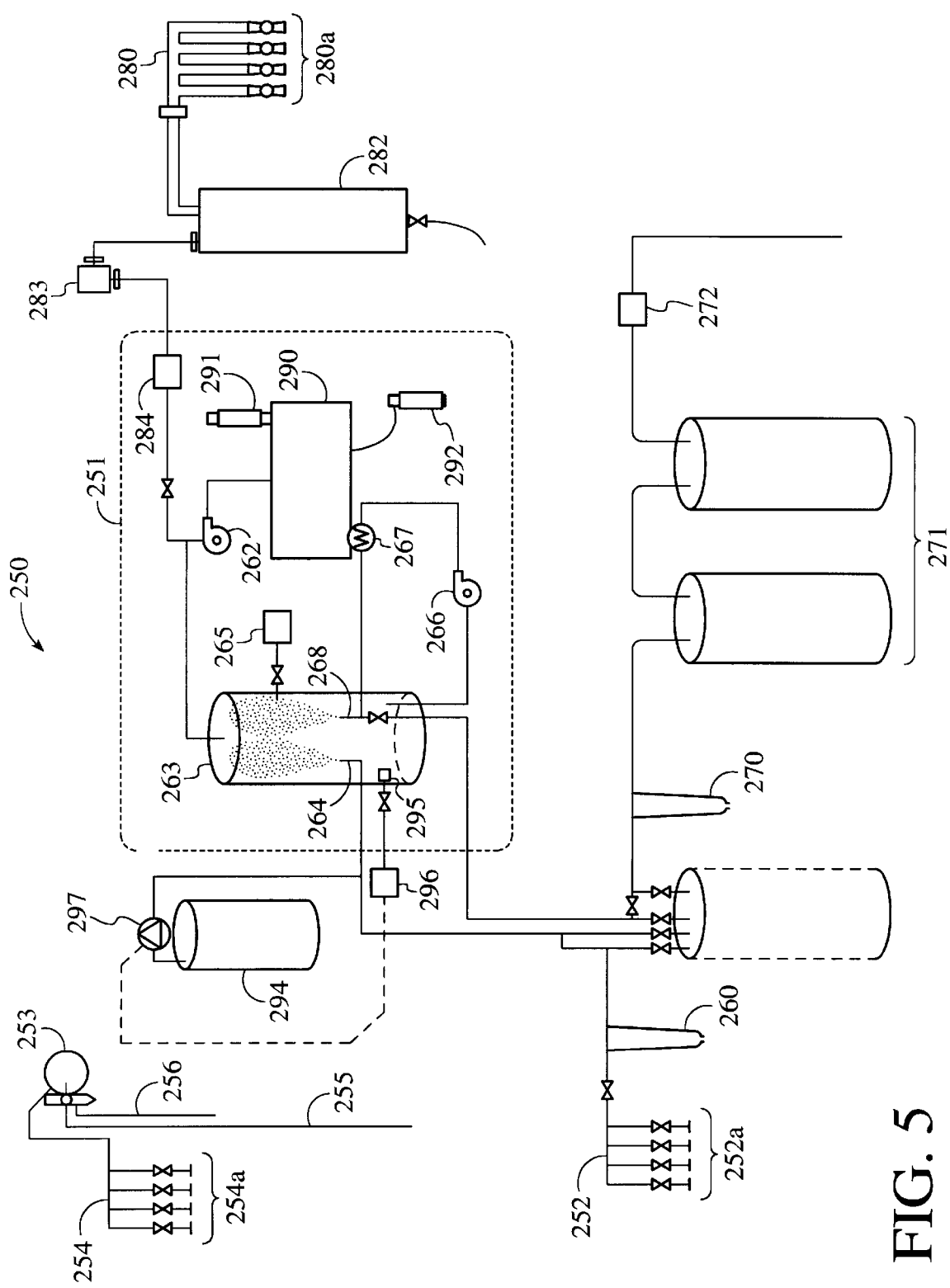
FIG. 5 shows a flow chart of a spray aeration, vacuum extraction treatment plant used in the present invention.

FIG. 5 shows a flow diagram of a treatment plant 250. In the currently preferred embodiment, treatment plant 250 includes a spray aeration, vacuum extraction (SAVE) unit 251 built by Remediation Systems International (RSI). Treatment plant 250 could be used, for example, to treat the fuel spill shown in FIG. I and is particularly effective when the concentration of fuel at the site is high. In the currently preferred embodiment, the transport lines carrying liquid water are generally in the range of approximately ½–1 inches in diameter, and the vapor transport lines are generally in the range of 1 ½–3 inches in diameter. In the currently preferred embodiment, the water transport lines are made of PVC or rubber and the vapor transport lines are made of flexible PVC tubing or other material compatible with VOCs and halogenated VOCs. It will be obvious to one skilled in the art that FIG. 5 is a simplified flow chart, and that treatment plant 250 includes additional valves, piping, gauges, sample ports, sensors (e.g. temperature, pH, level), alarms, and control systems which are not shown in FIG. 5.

Treatment plant 250 includes water intake manifold 252, which is coupled to all water pipes 20 at the site as described below. As shown in FIG. 5, there are a plurality of water pipes coupled to manifold 252 and, as mentioned previously, the number depends upon how many wells are drilled. Manifold 252 comprises from 4 to 16 water transport lines in the currently preferred embodiment. Each such pipe terminates at manifold 252 and is coupled to connection means 252a, which is a ¾ inch quick connect coupling in the currently preferred embodiment. Connection between manifold 252 of treatment plant 250 and all water transport lines 20 in connection port 100 of FIG. 2 is made by using hoses which have the appropriate quick connect couplings coupled to each end to provide for simple and easy connection between connection means 252a of treatment plant 250 and connection means 20a on each water transport line 20 in connection port 100. The total flow from each well (and, therefore, through each water transport line) is in the range of approximately 0.5–10 gallons per minute. Treatment plant 250 can treat up to approximately 10 gallons of water per minute. As mentioned previously, in the well casing 15a of FIG. 1, there is a pump which extracts the water from the well. The pump is powered by air that is supplied by a compressor (not shown) which is delivered to delta p controller 253 through transport line 255 shown in FIG. 5. The air for the pumps is delivered through air supply manifold 254 to each of the air transport lines 22. Manifold 254 comprises from 4 to 16 air transport lines from delta p controller 253. Each air transport line from delta p controller 253 terminates at manifold 254 and is coupled to connection means 254a, which are ½ inch quick connect couplings in the currently preferred embodiment. Connection between manifold 254 and each air transport line 22 in connection port 100 is made by using hosing which has appropriate quick connect couplings on each end to connect to connection means 254a and connection means 22a in a manner similar to that described for manifold 252. The delta p controller 253 is coupled to a controller (not shown) through line 256. The controller will determine when to pump and will operate the appropriate valves accordingly. If electrically powered pumps are used, the electric lines for each pump would be controlled by the controller, and each such line from the controller would be plugged into an electrical connection means coupled to a power line in connection port 100 which would replace connection means 22a and air transport line 22. The controller controls many of the operations in treatment plant 250. The controller can be hooked up to one of the phone lines provided in connection port 100 allowing for trouble-shooting and control of plant 250 from a remote location.

Water from water manifold 252 is then pumped through filter 260 (a 10–25 micron filter in the currently preferred embodiment) and from there into preheater 261. Preheater 261 heats the influent water to a temperature of approximately 85° F. From preheater 261, the water goes into spray aeration tank 263 in the SAVE unit 251. The water from preheater 261 is introduced into spray aeration tank 263 near the bottom through nozzles 264. As shown in FIG. 5, some of the VOCs will vaporize at the time the water is sprayed into spray aeration tank 263. Vacuum pump 262, meanwhile, pulls a vacuum on the spray aeration tank 263. Pump 266 pumps approximately 130 gpm water from the bottom of spray aeration tank 263 through heat exchanger 267 (which supplies heat from internal combustion engine 290 to be discussed below). Heat exchanger 267 heats the water to a temperature of approximately 110° F. Due to the combined effects of the heating in heat exchanger 267 and the vacuum pulled by vacuum pump 262, the majority of the VOCs in the contaminated water are volatilized and the vapor from nozzles 264 and 268, together with air from make-up unit 265, is pulled out of spray aeration tank 263 by vacuum pump 262. The vaporized volatile components in the water are released through nozzle 268 while the remainder of the water, now with most of the VOCs removed, flows into preheater 261. It is this heated water which preheats the water pulled in from the wells.

After being cooled to approximately 70° F. in preheater 261, the effluent from the SAVE unit 251 then flows through filter 270 (a 10 micron filter in the currently preferred embodiment) into carbon polishing array 271. In the currently preferred embodiment, carbon polishing array 271 comprises two 190 pound liquid phase granular activated carbon units connected in series. Generally, the first unit removes sufficient contaminants and VOCs to polish the water to be within acceptable limits for discharge, and the second unit is a back-up. After carbon polishing array 271, the treated water passes through totalizing flow meter 272 and then is discharged to a nearby stream, storm drain, sewer, or can be re-injected back into the ground water aquifer (as permitted by environmental authorities.)

Returning now to SAVE unit 251 of FIG. 5, pump 262, in addition to pulling VOC vapors from spray aeration tank 263, also pulls VOC vapor from vapor manifold 280. Vapor manifold 280 comprises from 4 to 16 vapor transport lines of 1 ½–3 inch diameter leading to treatment plant 250 in the currently preferred embodiment. Each such pipe terminates at manifold 280 and is coupled to connection means 280*a*, which are 1 ½ inch quick connect couplings in the currently preferred embodiment. Connection between manifold 280 of treatment plant 250 each of the vapor lines 21 in connection port 100 is made by using a hose that has the appropriate quick connect couplings coupled to each end to provide for simple and easy connection between connection means 280*a* of treatment plant 250 and connection means 21*a* of vapor transport lines 21 in connection port 100. The manifold 280 thus allows for connection between the treatment plant 250 and the vapor transport lines 21 of FIG. 1 through connection port 100 of FIG. 2. The total number of vapor transport lines 21 will vary depending upon the site and the amount of soil vapor contamination. Each vapor transport line 21 will pull in approximately up to 40 standard cubic feet per minute (SCFM) of vapor. Treatment plant 250 can treat up to approximately 100 CMF vapor intake.

With the above described manifolds 252 for groundwater, 254 for air supply, and 280 for vapor, and the connection means 252*a*, 254*a* and 280*a* all connections from treatment plant 250 to all required ground connections in connection port 100 can be made quickly and easily by attaching a connecting hose for each one of each type of pipe to the appropriate treatment plant manifold and the appropriate connection means in connection port 100. In general, the quick connect couplings in connection port 100 and in the manifolds of the treatment plants are male and the quick connect couplings on both ends of the connecting hoses are female in the currently preferred embodiment. However, in order to prevent an incorrect connection between two different types of of transport lines having the same size quick connect coupling, the mating of one of the connections can be reversed. Treatment plant 250 also has a connector (not shown) which mates with connector 29 of FIG. 2 for connecting the treatment plant to the electrical supply. Additionally, treatment plant 250 will have connection means for connections to phone lines and natural gas or propane supply, which will be available in connection port 100 if required. A treatment plant can thus be connected or disconnected in a manner of minutes. One treatment plant can be removed, and another plant placed on the site and connected within approximately one hour.

The vapor pulled into vapor manifold 280 then goes through moisture knockout 282, which removed any entrained moisture. The moisture removed from the vapor is periodically drained from knockout 282 and is then combined with well water from water pipes 252 to be treated in the SAVE unit 251. The vapor from vapor knockout 282 is pulled through vapor particle filter 283 and vapor rotameter and is then combined with the air and vapor from spray aeration tank 263. The VOC vapor from spray aeration tank 263 and from vapor manifold 280 is then burned in internal combustion engine 290, and the exhaust is released through standard automotive catalytic converter 291. The fuel removed from the site is incinerated by internal combustion engine 290 (except for the trace amounts removed in carbon polishing array 271) on-site and, therefore, it does not have be stored or transported to a hazardous material disposal facility and presents no risk of spill. In the treatment plant 250, internal combustion engine 290 is used to provide power to run vacuum pump 262, water pump 262 and air compressor 253.

In the present invention, acetic acid is added to the water flow during processing to prevent hard mineral deposits in the equipment. Acetic acid is ideal for this because in addition to preventing minerals from precipitating out of the groundwater and forming deposits within the equipment, it has no adverse environmental impact in the quantities used and can therefore be released in the effluent. The acetic acid is added to the treatment plant 250 from drum 294, which contains a solution of 10–30% acetic acid. Sensor 295 detects the pH in spray aeration tank 263. When the pH goes above approximately 7.5, controller 296 causes pump 297 to pump acetic acid solution into the water input line to spray aeration tank 263. When the pH in spray aeration tank 263 goes below approximately 7.0, controller 296 turns pump 297 off. The above set points will vary depending upon the site.

As mentioned previously, at some point the plant 250 will become less efficient as the concentration of fuel in the groundwater and soil vapor drops. When there is insufficient fuel to run internal combustion engine 290, auxiliary fuel is added from auxiliary tank 292 or from a natural gas utility supply discussed above. At this point, a different type of treatment plant may be more efficient, such as a biological or granulated activated carbon treatment plant. However, in the prior art a treatment plant such as treatment plant 250 would continue to be used until it no longer removed appreciable amounts of fuel due to the cost of tearing down treatment plant 250 and the cost of building a different type of plant.

In the prior art, after using treatment plant 250, the remaining clean-up would be performed by adsorption in a carbon-carbon unit similar to carbon polishing array 271 of FIG. 5. Usually, two to three carbon units would be used. The size and number of activated carbon cannisters would depend on the amount of vapor and/or water to be treated and the concentration of hazardous material. At the beginning of use, the carbon treatment is somewhat inefficient as the concentration, although too high for the treatment plant 250 to be used, is still somewhat high for carbon treatment, as the activated carbon units become loaded and must be changed frequently.

However, in the present invention, entire modular treatment plants can be interchanged quickly and easily without any need for on-site assembly of the new plant, or disassembly of the old plant. In the present invention, the plants are interchangeable with regard to ground connections. Once the standard ground connections have been made, the modular treatment plants can be connected without modification to the site. Further, all connections at the site are located in the below ground level connection port 100 of FIG. 2.

Figure 6:
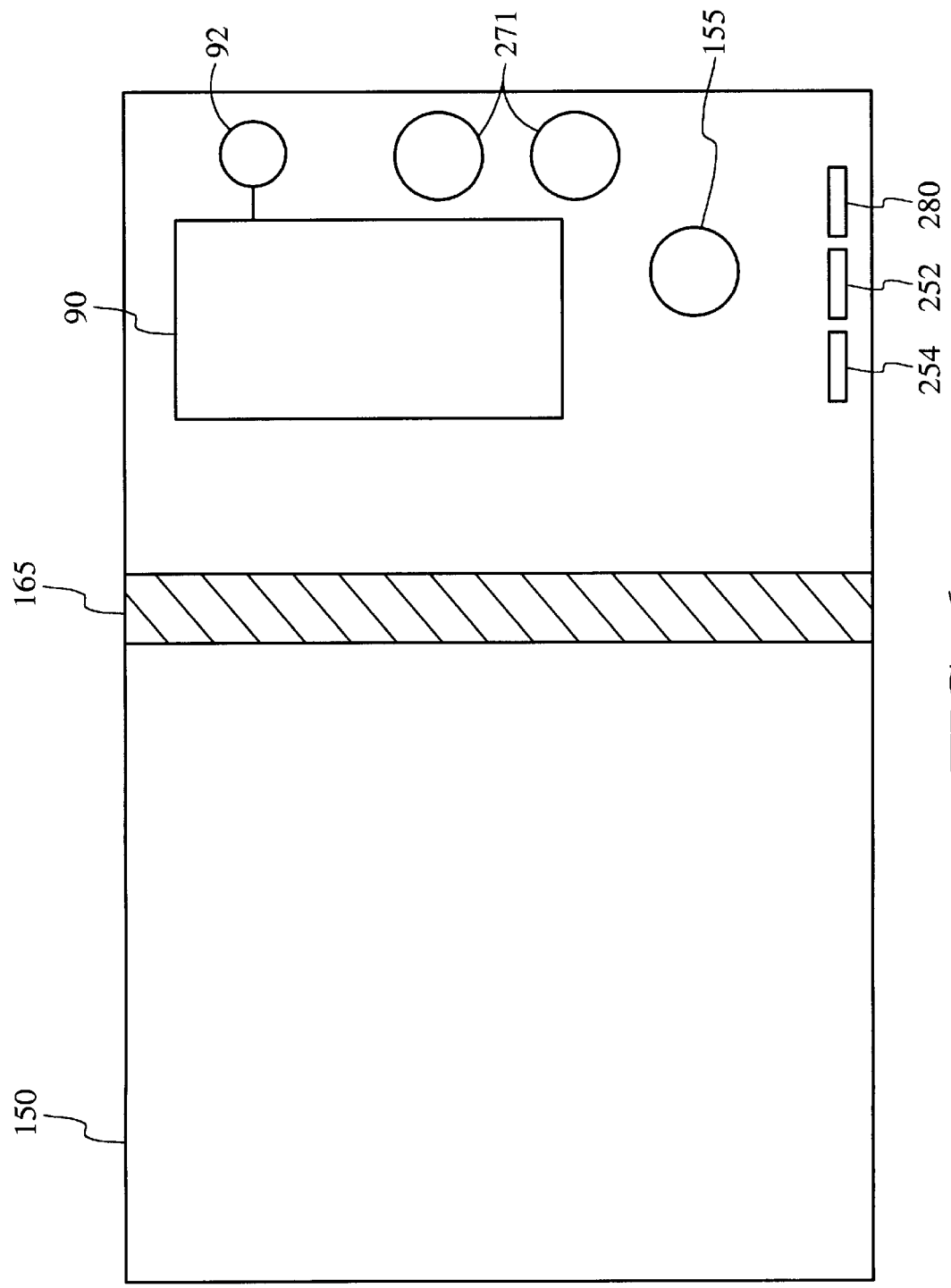
FIG. 6 shows the placement of the treatment plant of FIG. 5 in the enclosure of FIG. 4.
Figure 7:
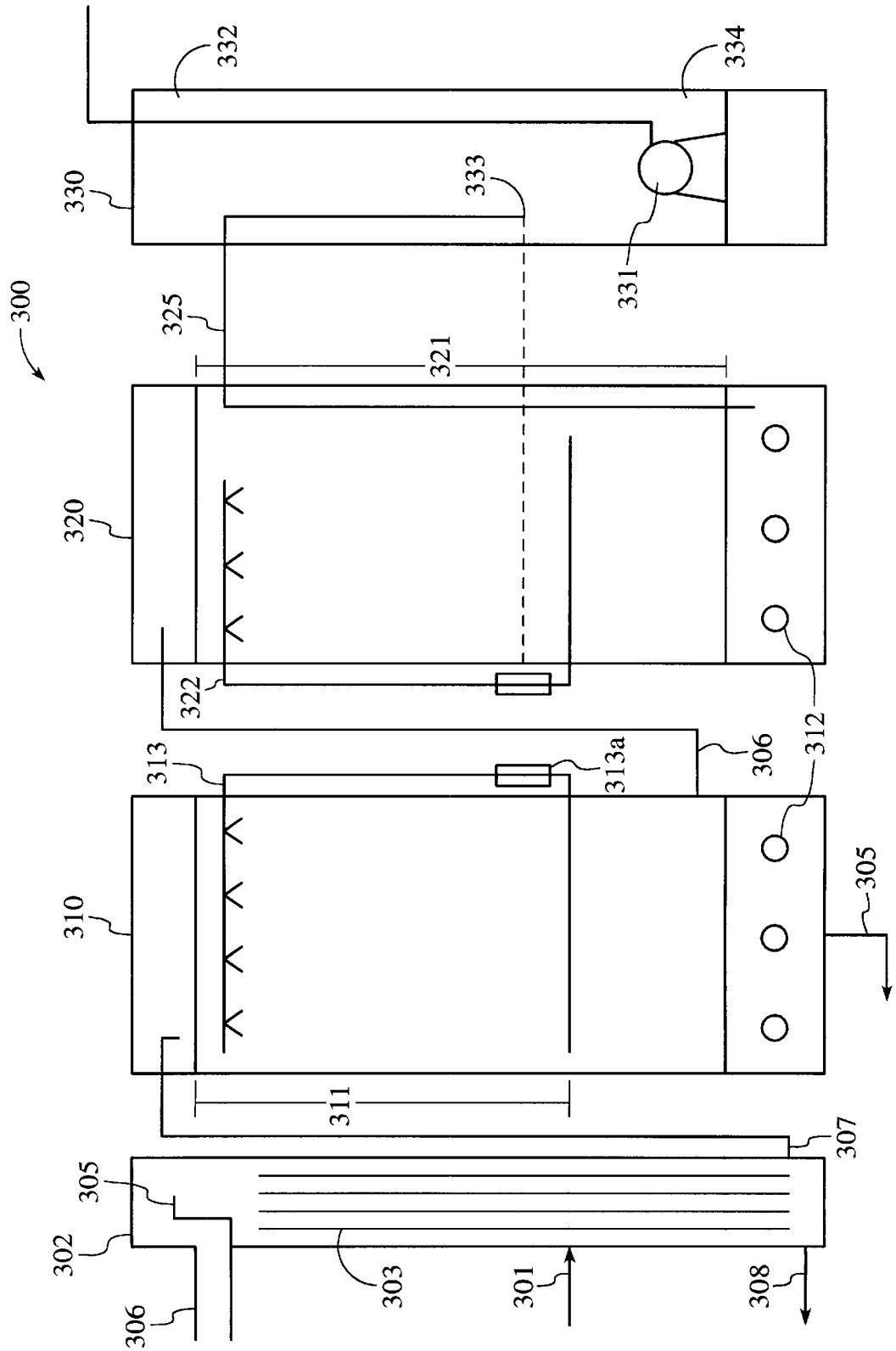
FIG. 7 shows a flow chart of a biological treatment plant.

FIG. 6 shows the placement of treatment plant 250 of FIG. 5 in enclosure 150, from above. Only the major pieces of equipment of treatment plant 250 are shown. The reference numbers in FIG. 6 correspond to those shown for treatment plant 250 in FIG. 5. Optionally, fire wall 165 can be placed in enclosure 150 to separate the internal combustion engine 290 from the remainder of the plant as a safety precaution. In placing treatment plant 250, or any other treatment plant, in enclosure 150, several considerations guide the placement of the equipment. If possible, all manifolds should be placed near the opening 155 in the bottom of enclosure 150 to facilitate connection to the connection in connection port 100. In the currently preferred embodiment, all manifolds are positioned approximately waist high to facilitate access. Also, equipment which must be replaced periodically, such as canisters of activated carbon, should be placed near a set of doors. Similarly, equipment needing frequent maintenance should be placed for convenient access. Finally, the equipment should be placed such that adequate ventilation through enclosure 150 is maintained. The pieces of equipment are held in place in enclosure 150 either by strapping/bracing to the walls of enclosure 150 or by an internal frame made of a perforated channel material such as those sold under the tradenames UNISTRUT or B-LINE FIG. 7 shows biological treatment plant 300. Transport line 301 is the input to the treatment plant 300. In the currently preferred embodiment, treatment plant 300 can treat up to approximately 10 gpm through transport line 301. Transport line 301 is coupled to one or more of the previously described water pipes 20 through a manifold (not shown) similar to manifold 252 of plant 250, from one or more water wells at the site. Similarly, treatment plant 300 has a manifold for air transport line similar to manifold 254 of treatment plant 250. As with treatment plant 250, treatment plant 300 also has connection means for connection to connector 29 of FIG. 2 for electric power, as well as connection means for connection to phone lines and natural gas as needed. As treatment plant 300 is not used for treating soil vapor, it has no vapor transport line connections. Transport line 301 flows into oil/water separator 302. Separator 302 has a 90 gallon capacity in the currently preferred embodiment. Separator 302 has coalescing tubes 303. The coalescing tubes 303 are made of an oleophilic material which has an affinity for VOCs and other hydrocarbons and thereby causes oil-like droplets to form on tubes 303. After the droplets have formed, they float to the top of separator 302, overflow weir 305, and are removed to storage tanks through pipes 306. The remainder of the water to be treated then flows to the first stage 310 of the biological treatment plant 300 through pipe 307. Sand and other particulates are removed through outlet 308 to a sludge drum (not shown) periodically as they accumulate.

In biological treatment plant 300, the contaminated water is treated by passing it through reactors holding a fixed film of naturally occurring microorganisms, referred to herein generally as bacteria, which consume hydrocarbons and convert them into harmless byproducts including water, carbon dioxide ($CO_2$) and some small chain intermediate hydrocarbons. The various pipes shown in FIG. 7 range from approximately ½ inch through 3 inches and are made of PVC. It will be obvious to one skilled in the art that FIG. 7 is a simplified flow chart and that treatment plant 300 includes additional valves, piping, gauges, sample ports, sensors (e.g. temperature, pH, level), alarms, and control systems which are not shown in FIG. 7.

The first stage reactor 310 is cylindrical. The capacity of the first stage is approximately 1,010 gallons in the currently preferred embodiment. In the region shown as 311 in FIG. 7, reactor 310 is packed with a packing material capable of holding a fixed film of bacteria. In the currently preferred embodiment, several circular wafers with a diameter of less than or equal to the inside diameter of the reactor 310, and a height of one foot are used as the packing material. The wafer comprises a grid of one inch square vertical cells. Each one foot wafer is offset with respect to the next so as not to form vertical channels running the length of the reactor. This placement allows for mixing of the flow, as well as ensuring adequate flow of water over all surfaces of the grids. In the currently preferred embodiment, the wafers are made of polyethylene. Generally, about 1/16 to 1/8 of an inch film of bacteria is formed on the packing material. The relatively large one inch grid spacing is used so that as dead bacteria fall off the grid, plugging problems within the grid do not occur. Once the film is formed, the bacteria consume the various hydrocarbons from the water as it passes over the packing material in region 311. The bacteria are naturally occurring bacteria found in the soil and water at the site which are introduced into the reaction chamber by pumping in groundwater, and allowing it to pass through the plant 300, which is set into total recycle for about five and a half weeks to allow for bacterial growth. The bacteria grow in much higher concentration in the reactor than in a natural state in the soil since the reactor provides ideal conditions for their growth. In reactor 310, air and nutrients, which aid in bacterial growth, are provided as described below.

Air is provided near the bottom of reactor 310 through spargers 312 which distribute air from an air compressor in fine, evenly distributed bubbles. Spargers 312 are tubular, porous pipes made of pumice-like material. Recycle loop 313 recycles water from near the bottom of the region 311 and sprays it back into the reactor 310 near the top of the regions 311. In the currently preferred embodiment, recycle loop 313 recycles approximately 10–100 gpm. Recycle loop 313 can be powered by air or steam eductors. Steam is useful if it is necessary to add heat to allow for optimum bacterial growth. Additionally, fertilizer containing nitrogen and phosphorous, which promote bacterial growth, are added to reactor 310 by injecting a solution containing treated water from the discharge sump (to be described below) and the fertilizer containing nitrogen and phosphorous. Also, the treated water contains additional bacteria, which helps maintain a sufficient supply of bacteria in the reactor.

Sludge, which includes bacteria detritus, sediments and hydrocarbons, flows out of outlet 315 to a sludge drain to be stored for later removal. After treatment in the first stage reactor 310, the partially treated water flows to a second stage reactor 320 through pipe 316. Water is transferred from oil water separator 302 to reactor 310, and from first stage reactor 310 to second stage reactor 320, by gravity flow.

Second stage reactor 320 is similar to first stage reactor 310. In the currently preferred embodiment, reactor 320 has a capacity of approximately 1,010 gallons. Reactor 320 has the same type of bacteria holding media as reactor 310, in the region 321. Recycle loop 322 recycles the treated water, provides a means for adding nutrients and heat if necessary, and is essentially identical in function to recycle loop 313 of reactor 310. In the currently preferred embodiment, recycle loop 322 recycles approximately 10–100 gpm. Finally, reactor 320 also has spargers 312 located at the bottom of the reactor.

Water from reactor 320 then flows into discharge sump 330 through pipe 325. Pump 331 is turned on when the water level in discharge sump 330 reaches level detector 332. As water is pumped out of discharge sump 330, the level of reactor 320 drops as water is siphoned through pipe 325 to keep the level of reactor 320 equal to the water level in discharge sump 330. When the level reaches the level of outlet 333 of pipe 325 (shown by the dashed line), the siphon is broken. Water no longer flows through pipe 325 until the level in reactor 320 is above the uppermost level of pipe 325. Pump 331 continues pumping until the water level is below level sensor 334 of discharge sump 330. At this point, pump 331 shuts off. Reactor 320 will fill to the upper level of pipe 325 in approximately one to three hours (depending upon influent flow into the plant 300). It will then overflow into discharge sump 330, which will again cause pump 331 to go on when the level reaches level sensor 332, staring the cycle once again. The time to pump reactor 320 down to the level of outlet 333 and discharge sump 330 down to the level of level sensor 334 is approximately 1 hour.

The above described pumping scheme creates a wet/dry zone in reactor 320 between the level of level sensor 332 and outlet 333 which periodically goes from being filled with water and being dry. This wet/dry scheme helps promote bacterial growth in the wet/dry region. Although the exact reason for the increased growth is not known, it is believed that the wet/dry scheme results in a more effective aeration, which stimulates oxygen based metabolism. Also, the wet/dry scheme encourages sloughing of dead bacteria. In the currently preferred embodiment, approximately one half of the total volume of reactor 320 is a wet/dry zone However, it will be appreciated that a smaller or larger portion of reactor 320 can be made a wet/dry zone by appropriate placement of the level sensors and outlets. Further, the periods of wet and dry can be varied to achieve optimal bacterial growth. Finally, if desired, reactor 310 can also be made to have a wet/dry zone.

As with treatment plant 250, all of the equipment shown in FIG. 7 for treatment plant 300 is placed in enclosure 150, using the same considerations in determining placement. Enclosure 150 provides a further benefit to biological treatment plant 300 in addition to the previously described advantages. Since enclosure 150 provides protection from weather conditions, the resulting environment inside of the reactors 310 and 320 is more stable than if these reactors were not enclosed. The stable environment provided by enclosure 150 prevents excessive temperature swings within the reactor, which helps promote consistent bacterial growth.

Although the enclosed modular treatment plant of the present invention has been illustrated by use of a spray aeration, vacuum extraction plant and a biological treatment plant, it will be understood that any type of treatment plant treating contaminated water or soil or both can be placed in the disclosed enclosure and fitted with appropriate manifolds and connection means allowing for all external connections to the underground piping and equipment to be made at a single, on-site, underground connection port 100. The placing of equipment is a matter of design choice for each such plant, but the considerations discussed above in regard to the placement of treatment plant 250 should guide the placement. The types of abatement technologies that can be utilized with the present invention include, but are not limited to, carbon adsorption for liquid and vapor (i.e. carbon plants for treating both soil vapor and groundwater), ultra-violet, peroxide, ozone, air stripping and catalytic oxidation as well as any combination of the foregoing in a single plant.

The enclosed treatment plants described have several benefits over the prior art in addition to those previously described. The enclosure 150 is stackable. Therefore, if several treatment plants are being transported, they can be placed in enclosure 150, which can then be stacked and bolted together allowing for space efficient transport. Also, since the treatment plants are fully assembled inside of enclosure 150 before arrival on the site, it may be possible, depending upon local regulations, to obtain a permit for the plant itself, thereby obviating the need for a building permit at each site. Finally, although the invention was illustrated by use of a single enclosed treatment plant of each type, one or more additional units can be coupled together to provide for increased capacity. Each of the manifolds for each type of connections for all types of treatment plants contains an additional fitting for splitting the total flow of and vapor from the on-site connection port. A portion of the flow is processed as described in the first treatment plant. The remainder of the flow is piped to a second manifold which serves as the connection port for the additional enclosed treatment plant. The second manifold for the additional enclosed treatment plant can be placed at any location on the first enclosure to allow for quick and easy connection to the additional treatment plant.

Thus, an enclosed, transportable, interchangeable hazardous material treatment method and apparatus is described. The enclosed plant can utilize any one of a wide variety of hazardous material abatement technologies while still utilizing a standard, on-site underground connection port to make all necessary connections to the site.

We claim:

1. A hazardous material treatment plant for processing hazardous material from a site comprising:

a) a transportable enclosure;

b) a hazardous material treatment facility located in said transportable enclosure;

c) connection means coupled to said hazardous material treatment facility; and, d) a connection port located at a site, said connection port being coupled to said connection means, said connection port comprising means for extracting hazardous material from ground soil and/or ground water at said site for processing in said hazardous material treatment facility, wherein said means for extracting said hazardous material comprise one or more transport lines extending into the ground at said site, at least one of said transport lines being an extraction line, wherein said hazardous material treatment facility may be one of a plurality of different types of hazardous material treatment facilities, at least one of said types of hazardous material treatment facilities being optimized for treating a different concentration range of said hazardous material than another of said types of hazardous material treatment facilities and wherein said connection means of each of said plurality of different types of hazardous material treatment facilities can be coupled to said connection port.

2. The treatment plant as described in claim 1 wherein said transportable enclosure is made of a material which protects said hazardous material treatment facility from environmental and climatic conditions and from vandalism or tampering.

3. The treatment plant as described in claim 1 wherein said transportable enclosure further comprises means for containing said hazardous material in the event of a discharge of hazardous material within said transportable enclosure.

4. The treatment plant as described in claim 3 wherein said means for containing said hazardous material comprise at least two liners located on a base of said transportable enclosure, each of said liners being at least 15 mils thick, said liners having a spacing therebetween, said spacing having an insulation material located therein, said spacing further having at least one sensor located therein, said sensor being capable of detecting said hazardous material or moisture located within said spacing.

5. The treatment plant as described in claim 4 wherein said liners and said insulation material are made of HDPE.

6. The treatment plant as described in claim 4 wherein said means for containing said hazardous material has a capacity to hold at least 110% of the volume of a vessel in said transportable enclosure, said vessel being the largest vessel in said transportable enclosure.

7. The treatment plant as described in claim 5 wherein said means for containing said hazardous material has a capacity to hold at least 110% of the volume of a vessel in said transportable enclosure, said vessel being the largest vessel in said transportable enclosure.

8. The hazardous material treatment plant as described in claim 4 wherein at least one of said different types of hazardous material treatment facilities is coupled to a liquid extraction line and at least one of said different types of hazardous material treatment facilities is coupled to a vapor extraction line.

9. The treatment plant as described in claim 1 wherein said connection port is located below ground level, said connection port being surrounded by a material which is impermeable to liquid.

10. The treatment plant as described in claim 1 wherein said connection port further comprises means for connections to all utilities required by said treatment plant.

11. The hazardous material treatment plant as described in claim 10 wherein at least one of said different types of hazardous material treatment facilities is coupled to a liquid extraction line and at least one of said different types of hazardous material treatment facilities is coupled to a vapor extraction line.

12. The treatment plant as described in claim 1 wherein said hazardous material treatment facility comprises spray aeration, vacuum extraction treatment means.

13. The treatment plant as described in claim 12 wherein said transportable enclosure further comprises a firewall, said firewall separating an internal combustion engine and an auxiliary fuel source from other processing and storage equipment.

14. The treatment plant as described in claim 1 wherein said enclosure containing said hazardous material treatment facility can be stacked and fastened securely on one or more additional enclosures.

15. The treatment plant as described in claim 1 wherein said treatment plant can be coupled with one or more additional treatment plants to provide for increased treatment capacity.

16. The hazardous material treatment plant as described in claim 1 wherein at least one of said different types of hazardous material treatment facilities is coupled to a liquid extraction line and at least one of said different types of hazardous material treatment facilities is coupled to a vapor extraction line.

17. The hazardous material treatment plant as described in claim 16 wherein said hazardous material treatment facility comprises means for destroying at least some of said hazardous material at said site.

18. The hazardous material treatment plant as described in claim 1 wherein said hazardous material treatment facility comprises means for destroying at least some of said hazardous material at said site.

19. A hazardous material treatment apparatus for processing hazardous material from a site comprising:
  a) a connection port located at a site, said connection port comprising means for extracting hazardous material from ground soil and/or ground water at said site, said means for extracting comprising one or more transport lines, wherein said one or more transport lines extend into the ground at said site, wherein at least one of said transport lines is a extraction line; and,
  b) a transportable enclosed treatment plant, said transportable enclosed treatment plant comprising:
    i) an enclosure;
    ii) a hazardous material treatment facility located in said enclosure;
    iii) a manifold located in said enclosure, said manifold having means for making connection to said one or more transport lines at said connection port, said manifold further having means for making connection to said hazardous material treatment facility, wherein said one or more extraction lines are coupled to one or more inputs of said hazardous material treatment facility through said manifold to convey said hazardous material from said site to said hazardous material treatment facility, wherein said hazardous material treatment facility may be one of a plurality of different types of hazardous material treatment facilities at least one of said types of hazardous material treatment facilities being optimized for treating a different concentration range of said hazardous material than another of said types of hazardous material treatment facilities and wherein each of said different types of hazardous material treatment facilities can be coupled to said connection port.

20. The apparatus as described in claim 19 wherein said transport lines comprise one or more output transport lines, said manifold further comprises means for making connection to said one or more output transport lines, and said manifold further comprises means for making connection to one or more sources of one or more materials to be output to said site wherein said one or more output transport lines are coupled to said one or more sources of one or more materials to be output to said site.

21. The apparatus as described in claim 19 wherein said connection port is located below ground level, said connection port being surrounded by a material which is impermeable to fluid.

22. The apparatus as described in claim 19 wherein said enclosed treatment plant can be stacked and fastened securely on one or more additional enclosed treatment plants.

23. The apparatus as described in claim 19 wherein said treatment plant can be coupled with one or more additional treatment plants to provide for increased treatment capacity.

24. The treatment plant as described in claim 19 wherein said treatment plant is a spray aeration, vacuum extraction plant.

* * * * *